United States Patent [19]

Van Manen et al.

[11] 4,235,949
[45] Nov. 25, 1980

[54] NON-WRINKLING AUTOMOTIVE TRIM STRIP

[75] Inventors: Dick T. Van Manen; Gary S. Klein, both of Canandaigua, N.Y.

[73] Assignee: Voplex Corporation, Pittsford, N.Y.

[21] Appl. No.: 928,536

[22] Filed: Jul. 27, 1978

Related U.S. Application Data

[63] Continuation-in-part of Ser. No. 885,541, Mar. 13, 1978, Pat. No. 4,172,745.

[51] Int. Cl.² .............................................. B32B 15/08
[52] U.S. Cl. ........................................ 428/31; 52/312; 293/1; 428/458; 428/463
[58] Field of Search ........................ 428/31, 458, 463; 52/312; 293/1

[56] References Cited
U.S. PATENT DOCUMENTS

| | | | |
|---|---|---|---|
| 2,993,806 | 7/1961 | Fisher et al. | 428/463 X |
| 3,013,919 | 12/1961 | Bialy | 428/31 X |
| 3,046,174 | 7/1962 | Brooks et al. | 428/31 X |
| 3,152,950 | 10/1964 | Palmquist et al. | 428/31 X |
| 3,681,180 | 8/1972 | Kent | 428/31 X |
| 3,811,989 | 5/1974 | Hearn | 428/31 X |

Primary Examiner—Henry F. Epstein
Attorney, Agent, or Firm—Stonebraker, Shepard & Stephens

[57] ABSTRACT

An automotive trim strip laminate formed of a strip of polyester material bearing a layer of metallic material covered by a thin polyvinyl chloride layer bonded to a supporting substrate of a flexible plasticized polyvinyl chloride material is made so that the laminate can be thermally bonded to a support material along a curved path without any irregularity, which is recognized as caused by compression wrinkling from thermal stress along radially inner regions of the curved path. This is prevented by selecting the polyester strip and the thin polyvinyl chloride layer with physical characteristics and dimensions to provide the metallized polyester strip with sufficient dimensional stability relative to the polyvinyl chloride substrate to prevent any such compression wrinkling, and one preferred way is to make the thin polyvinyl chloride layer substantially unplasticized and formed of a smooth, medium impact material.

3 Claims, 3 Drawing Figures ent application recognized the basic problem of compression wrinkling of automotive trim strips and proposed one solution. This application involves the same recognition of the problem and proposes alternative preferred solutions as explained below.

NON-WRINKLING AUTOMOTIVE TRIM STRIP

RELATED APPLICATIONS

This application is a continuation-in-part of U.S. Application Ser. No. 885,541 filed Mar. 13, 1978 by Dick T. VanManen now U.S. Pat. No. 4,172,745 entitled "Method of Making Automotive Trim Strip Laminate" and involving inventive recognition of the problem solved by the subject matter claimed in this application.

BACKGROUND OF THE INVENTION

Automotive trim strips have been formed of laminates that give an appearance of bright metallic strips. A typical laminate includes a thin strip of polyester material bearing a layer of metallic material covered by a thin polyvinyl chloride layer bonded to a supporting substrate of a flexible plasticized polyvinyl chloride (PVC) material. The metallic layer is vacuumed deposited on the polyester material. One or several polyester strips can be bonded to a single PVC substrate; and many different widths and crosssectional configurations can be used, depending on the visual and functional effects desired. Such automotive trim laminate are made by extruding the flexible PVC substrate and bonding to the flexible PVC substrate one or more polyester strips bearing a metallic layer and a thin PVC layer to form a laminate that is cooled and later mounted on a support panel. Such strips can have protective exterior resin coatings and can be mounted along the outside of an automobile or truck body; and they can also be mounted on inside door panels, dashboards, seats, and other places in the interiors of automobiles and trucks.

The visual appearance of metalized plastic automotive trim strips requires uninterrupted uniformity in the smoothness and highly polished appearance of the metallic layer that is visible through the polyester material. For automotive design purposes, it is also desirable to mount such automotive trim strips along curved paths as well as straight paths; and this leads to problems solved by the invention.

The usual way of mounting metalized plastic automotive trim strips to an interior door panel, for example, is to hold the trim strip accurately in place on the door panel with a holding die while the strip and its support surface are heated, preferably by dielectric heating, to thermally bond the trim strip to the door panel. Automotive design also requires that the mounted trim strips fit accurately to the desired path and remain securely attached and dimensionally stable throughout the temperature extremes likely to be encountered by an automobile.

When trim strips made according to prior art methods are thermally mounted along curved paths, disfigurement occurs that spoils their appearance. The radially inner edge of a curved trim strip develops slight irregularities or tiny wrinkles that appear to be defects and spoil the otherwise smooth metallic appearance.

The invention involves recognition and study of the causes and possible solutions of the problems of mounting metalized plastic automotive trim strips along curved paths. The invention proposes a simple and effective way to make a metalized plastic automotive trim strip so that it is thermally mountable along a curved path without spoiling the uniformity of its appearance. The inventive solution also aims at economy, simplicity, and effectiveness in meeting all automotive design requirements for metalized plastic automotive trim strips while allowing such strips to be thermally mounted along curved paths.

SUMMARY OF THE INVENTION

The invention applies to an automotive trim strip that can be thermally bonded to a support material to extend along a curved path, and the trim strip is formed as a laminate of a strip of thin polyester material bearing a layer of metallic material covered by a thin polyvinyl chloride layer bonded to a supporting substrate of a flexible plasticized polyvinyl chloride material. The polyester strip and the thin PVC layer are formed with preselected physical characteristics and dimensions to provide the metalized polyester strip with sufficient dimensional stability relative to the flexible PVC substrate to prevent compression wrinkling of the metalized polyester strip at radially inner regions of the curved path in response to stress from thermal variation occurring during thermal bonding of the flexible PVC substrate to a support material. One preferred way is to make the thin PVC layer substantially unplasticized so that it is relatively rigid, and another preferred way is to make the polyester strip substantially thicker and stronger to provide better support for the metalized layer.

DRAWINGS

FIGS. 1 and 2 are schematic fragmentary views of preferred embodiments of trim strip laminates made according to the invention; and FIG. 3 is a fragmentary view of a curved path portion of a trim strip made according to the invention.

DETAILED DESCRIPTION

Makers of automotive trim strips presently secure metalized polyester strips from a supplier, bond these to a flexible PVC substrate according to the specifications of an automotive manufacturer, and supply the trim strips either in indefinite lengths or in predetermined configurations to the automotive manufacturer for assembly in vehicles by bonding the trim strips to a support. The bonding for mounting trim strips in a vehicle is generally thermal bonding, and is ordinarily accomplished by dielectrically heating a trim strip while it is held in place. The flexible PVC substrate expands and contracts from the thermal variation involved in the bonding process, and trim strips thermally bonded along curved paths have produced tiny irregularities in the otherwise smooth and uniformly polished appearance of the metalized layer. This is apparently caused by the expansion and contraction of the flexible PVC substrate during the thermal bonding process. The compression wrinkling is very tiny or microscopic wrinkles that look like cracks and give the wrinkled portion of the trim strip a crazed appearance. In hopes of preventing this problem, automotive manufacturers have specified annealing of trim strips so that they experience minimal dimensional change during the thermal bonding process.

The parent application by one of the inventors named in this application recognized the basic problem of compression wrinkling of automotive trim strips and proposed one solution. This application involves the same recognition of the problem and proposes alternative preferred solutions as explained below.

Figure 1:
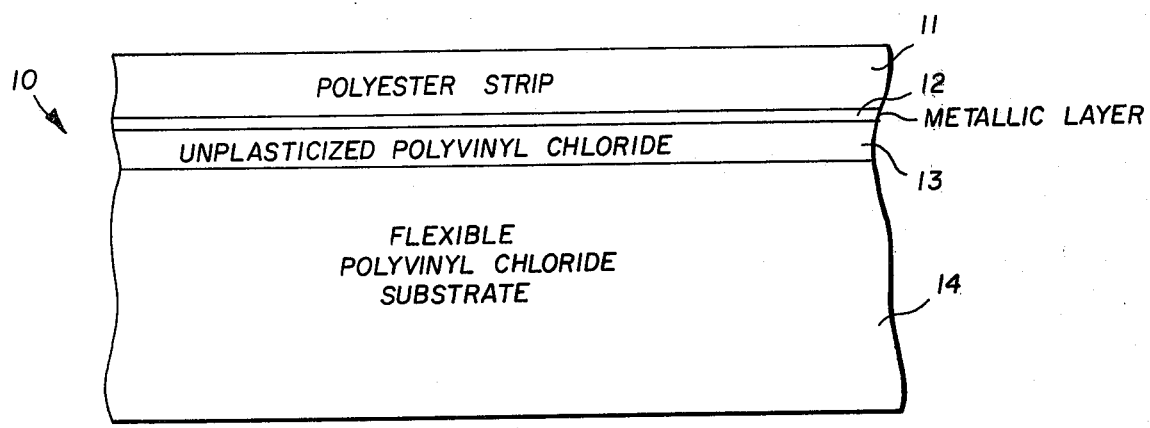

One preferred way of preventing compression wrinkling of the metalized polyester strip according to this invention is schematically shown in FIG. 1. Trim strip 10 includes a thin polyester strip 11 bearing a layer of metallic material 12 covered by a thin PVC layer 13. Laminate layers 11–13 are bonded to a flexible PVC supporting substrate 14 in one of many configurations to ready automotive trim strip 10 for thermal bonding to a support material in assembling a vehicle. To prevent compression wrinkling of metallic layer 12 and polyester strip 11 as thermal bonding of laminate 10 occurs, the thin PVC layer 13 is made of unplasticized polyvinyl chloride that is substantially rigid and much less flexible than the ordinary PVC layer used in prior art configurations. Making PVC layer 13 of relatively rigid and unplasticized material gives polyester strip 11 and its metallic layer 12 sufficient dimensional stability relative to the flexible PVC substrate 14 so as to resist compression wrinkling and produce a final product that retains its uniformly polished metallic appearance throughout its extent around curved paths.

Figure 3:
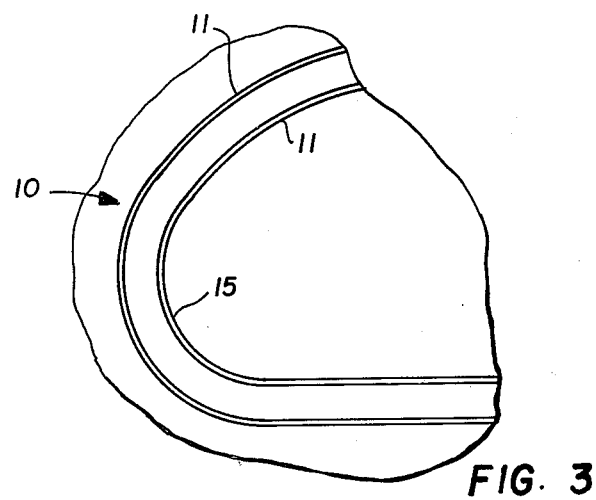

FIG. 3 shows a length of trim strip 10 having a pair of separated metalized polyester strips 11 along inner and outer edges extending around a curved path where compression wrinkling would otherwise occur along a radially inner region 15. Making PVC layer 13 of unplasticized and relatively rigid material prevents such compression wrinkling. PVC layer 13 is also preferably made of smooth and medium impact material about 0.15 mm thick and having a hardness of approximately 75 to 85 Shore D Durometer. Metalized polyester strip 11 has a normal thickness of about 0.012 mm. Thicknesses can vary somewhat, with thinner materials being preferred for economy and handling advantages.

Figure 2:
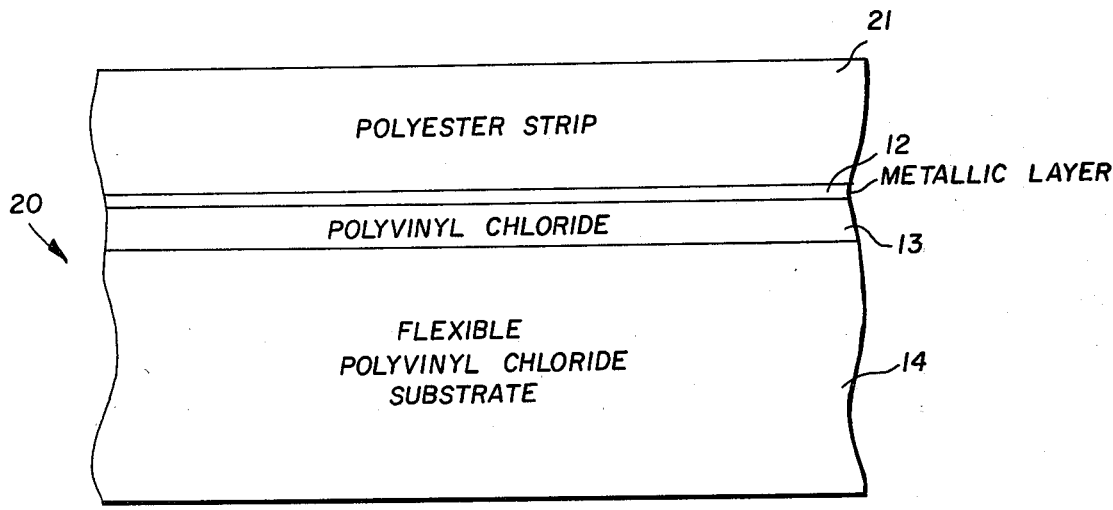

Another preferred solution to the compression wrinkling problem is schematically shown by automotive trim strip 20 of FIG. 2. Metallic layer 12, PVC layer 13, and flexible PVC substrate 14 are the same as generally known in the art; and the difference is in polyester strip 21, which is made substantially thicker than the 0.012 to 0.015 mm thickness that is common in the art and is preferably made at least 0.025 mm thick for greater strength and dimensional stability. Polyester strip 21 is formed of a material that is not as flexible as PVC substrate 14, and strip 21 also generally has a smaller coefficient of thermal expansion than substrate 24. Making strip 21 double or more the usual thickness gives it sufficient strength or dimensional stability to resist compression wrinkling as substrate 14 is thermally bonded to a support material.

It is also possible to combine the embodiments of FIGS. 1 and 2 by using a wholly or partially unplasticized PVC layer 13 combined with a somewhat thicker and stronger polyester strip 21 so that the metallic layer 12 is portected from compression wrinkling in response to thermal variation during the bonding process.

We claim:

1. An automotive trim strip that can be thermally bonded to a support material to extend along a curved path, said trim strip being formed as a laminate of a strip of thin polyester material coated with a layer of metallic material that is covered by a thin polyvinyl chloride protective layer the exposed surface of which is then bonded to a supporting substrate of a flexible plasticized polyvinyl chloride material, said trim strip comprising: said thin polyvinyl chloride protective layer being substantially unplasticized to provide said metallic layer coated on said polyester strip with sufficient dimensional stability relative to said polyvinyl chloride substrate to prevent compression wrinkling of said metalized polyester strip at radially inner regions of said curved path in response to stress from thermal variation occurring during thermal bonding of said polyvinyl chloride substrate to a support material.

2. The trim strip of claim 1 wherein said thin polyvinyl chloride layer is smooth, medium impact material.

3. The trim strip of claim 1 wherein said polyester strip is relatively thick and strong.

* * * * *